United States Patent [19]

Wahl

[11] 4,163,489

[45] Aug. 7, 1979

[54] FEEDER APPARATUS FOR FIBROUS MATERIALS

[76] Inventor: Eugene A. Wahl, 294 Forest Ave., Glen Ridge, N.J. 07028

[21] Appl. No.: 499,111

[22] Filed: Aug. 21, 1974

[51] Int. Cl.² .................................................. G01G 11/08
[52] U.S. Cl. ................................. 198/505; 198/537; 198/616; 222/55; 222/318; 131/22 R; 131/108; 131/110
[58] Field of Search ..................... 198/37, 39, 62, 504, 198/505, 533, 537, 544, 562, 616, 855, 856, 524; 222/55, 318; 177/16, 119, 121; 131/22 A, 108, 109 R, 109 B, 109 AB, 84 C, 110, 22 R

[56] References Cited

U.S. PATENT DOCUMENTS

| 669,138 | 3/1901 | Grabau | 131/64 R |
|---|---|---|---|
| 1,724,319 | 8/1929 | Schunemann | 131/109 R |
| 1,810,904 | 6/1931 | Carlson | 131/109 R |
| 2,286,554 | 6/1942 | Lieberman | 222/55 |
| 2328178 | 5/1975 | DEX . | |
| 2,566,210 | 8/1951 | Kendall et al. | 198/39 |
| 2,638,305 | 5/1953 | Miller | 198/39 |
| 3,786,961 | 1/1974 | Wahl et al. | 222/55 |
| 3,858,759 | 1/1975 | Lubenow | 222/55 |

FOREIGN PATENT DOCUMENTS

| 1127769 | 4/1962 | Fed. Rep. of Germany | 198/533 |
|---|---|---|---|
| 2328178 | 5/1975 | Fed. Rep. of Germany | 131/109 AB |
| 982382 | 2/1965 | United Kingdom | 131/84 C |

*Primary Examiner*—Joseph E. Valenza
*Attorney, Agent, or Firm*—Leitner, Palan, Martin & Bernstein

[57] ABSTRACT

Feeder apparatus in which bulk material, in fibrous or stringy form, is delivered onto an endless belt by means of a rotating rake. The weight of the material on the belt is sensed by a transducer which effects the operation of a control system for automatically adjusting the belt speed to maintain a constant discharge of the material from an end of the belt. Excess material deposited on the belt is returned to the hopper by the rotating rake.

24 Claims, 5 Drawing Figures

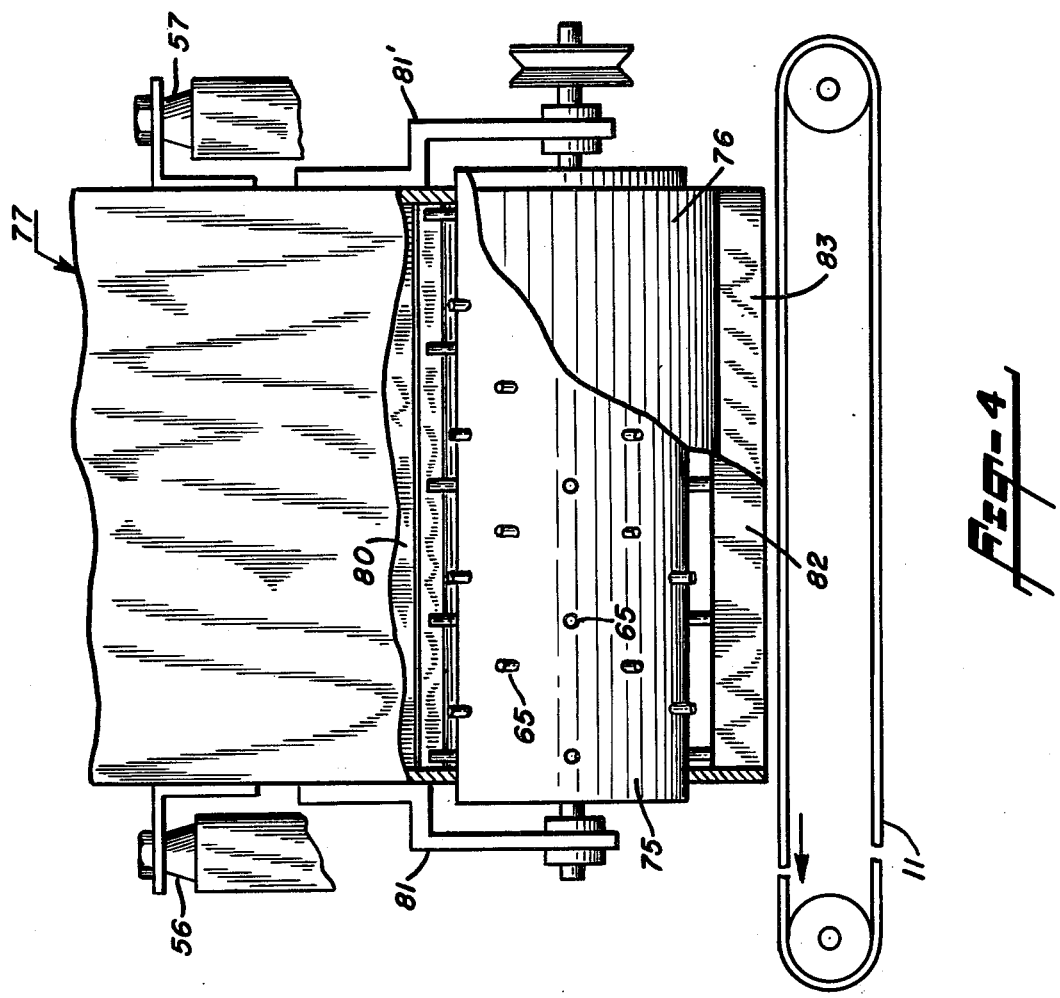
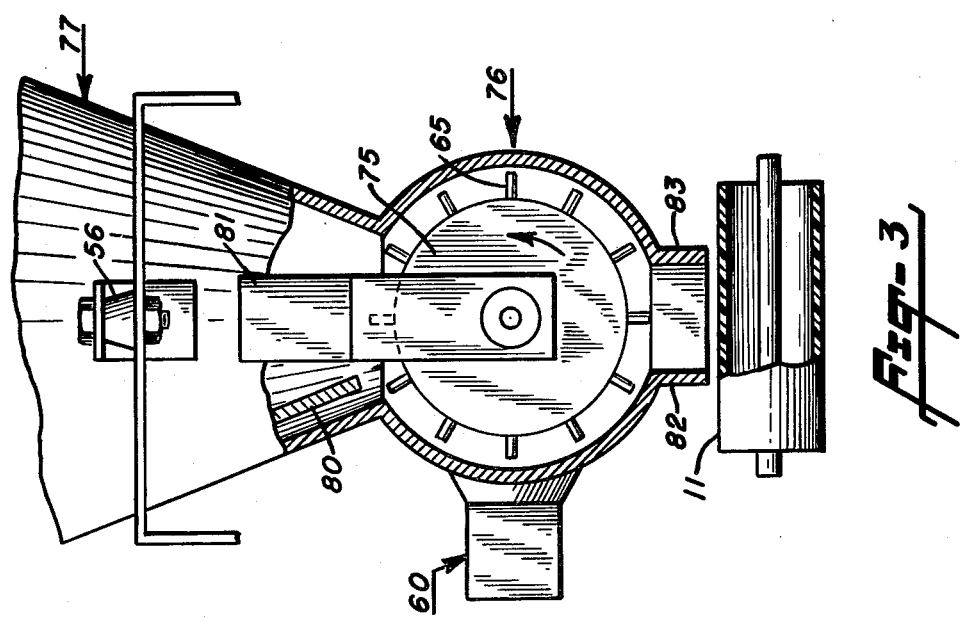

FEEDER APPARATUS FOR FIBROUS MATERIALS

BACKGROUND OF THE INVENTION

Apparatus to which this invention relates is used to deliver bulk material to a processing stage at a constant, predetermined feedrate. Material from a supply hopper is deposited on a pivotally-mounted endless belt, the linear speed of the belt being continuously adjusted to compensate for deviations between the material carried by the belt and a predetermined, desired weight.

Material of fibrous or stringy form is difficult to feed as it has a variable bulk density caused by moisture absorption and, also, such material tends to clump together and matte even under controlled moisture conditions. Feeders as made heretofore have not been satisfactory in achieving a uniform delivery of the fibrous material from a supply hopper to the weigh belt, thereby making it impossible to maintain a precise, constant material feedrate.

Apparatus made in accordance with this invention utilizes a rotating rake for movement of the material from the hopper to a discharge opening spaced above an endless belt. The material delivered to the belt has a fairly uniform bulk density and the rate at which such material is deposited on the belt exceeds the rate at which the belt transports material away from said discharge opening. The excess material is returned to the hopper by the rotating rake, thereby to maintain a uniform heighth of the material transported by the belt.

SUMMARY OF THE INVENTION

An axially rotatable drum, carrying a plurality of radially-extending pins is positioned to receive material from a supply hopper having an opening in the bottom thereof. The drum moves material from the hopper along a first path to a discharge opening spaced above an endless belt. The ends of the pins generate circles concentric with the drum axis and close to the discharge opening so that when the heighth of the material being deposited on the belt extends above the said discharge opening, the rake returns the excess material to the hopper along a second path. This prevents clogging of the material at the discharge opening and provides a uniform heighth of the material being transported away from the discharge opening by the belt. The hopper and the drum are vibrated to promote the flow of the material out of and back into the hopper. Control means are provided to continuously adjust the belt speed in correspondence with the weight of the material carried by the belt, thereby to provide a constant, precise feedrate of material discharged from an end of the belt.

An object of this invention is the provision of a feeder particularly adapted to deliver fibrous or stringy material at a constant, predetermined feedrate.

An object of this invention is the provision of a feeder in which fibrous material is delivered from a supply hopper onto a moving belt by means of a rotary rake.

An object of this invention is the provision of feeder apparatus in which fibrous material is delivered from a supply hopper unto a moving belt by a rotating rake, in which the rate at which material is deposited on the belt exceeds that at which material is transported on the belt, and in which excess material deposited on the belt is returned to the hopper by the rotating rake.

The above-stated and other objects and advantages of the invention will be apparent from the following description taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views:

FIG. 3 is a fragmentary front elevational view showing apparatus made in accordance with another embodiment of the invention with portions of the drum housing and hopper broken away;

FIG. 4 is a right side elevational view thereof; and

DESCRIPTION OF PREFERRED EMBODIMENTS

Figure 1:
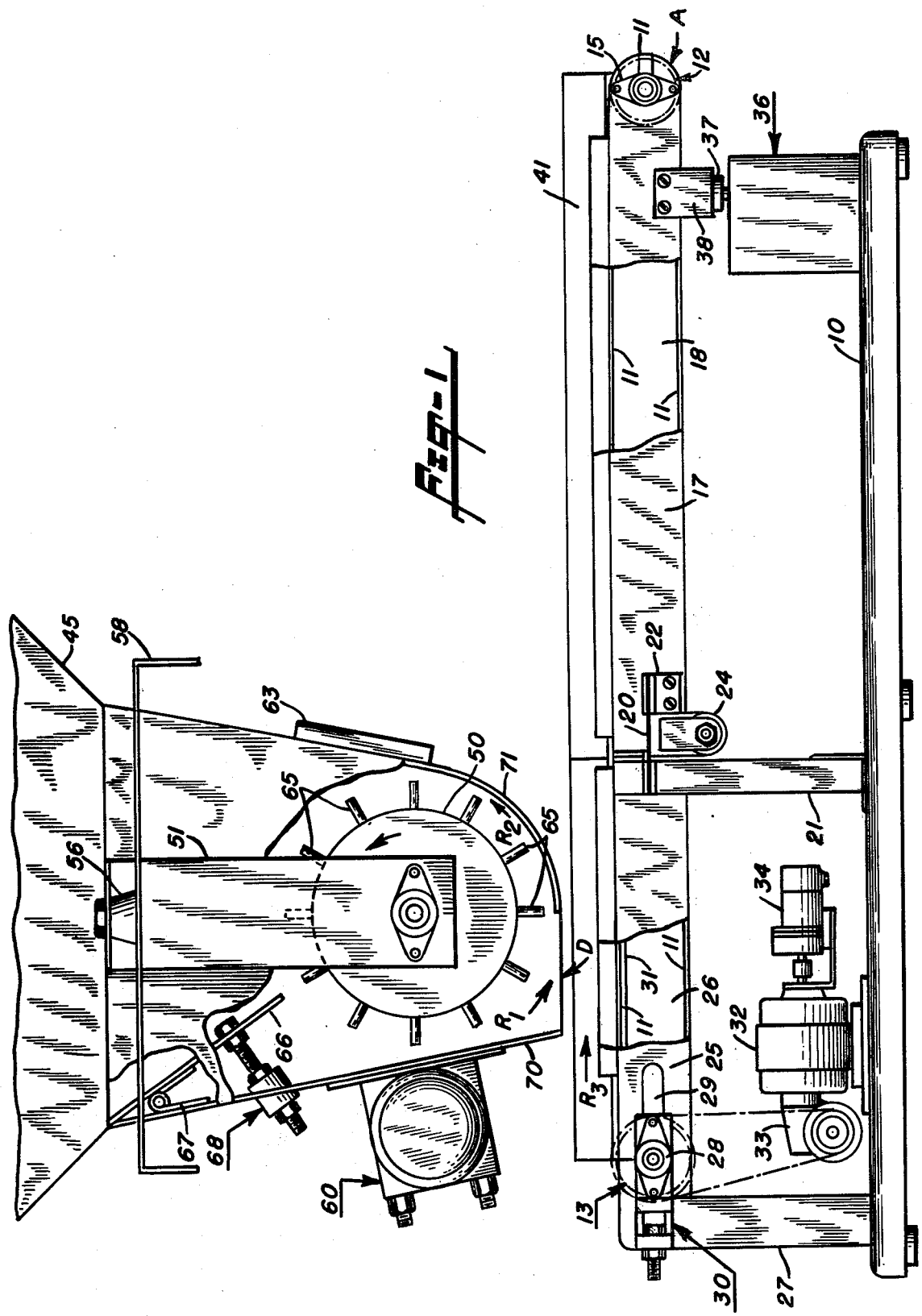
FIG. 1 is a left side elevational view showing apparatus made in accordance with one embodiment of the invention, with portions of the side wall of the hopper broken away.
Figure 2:
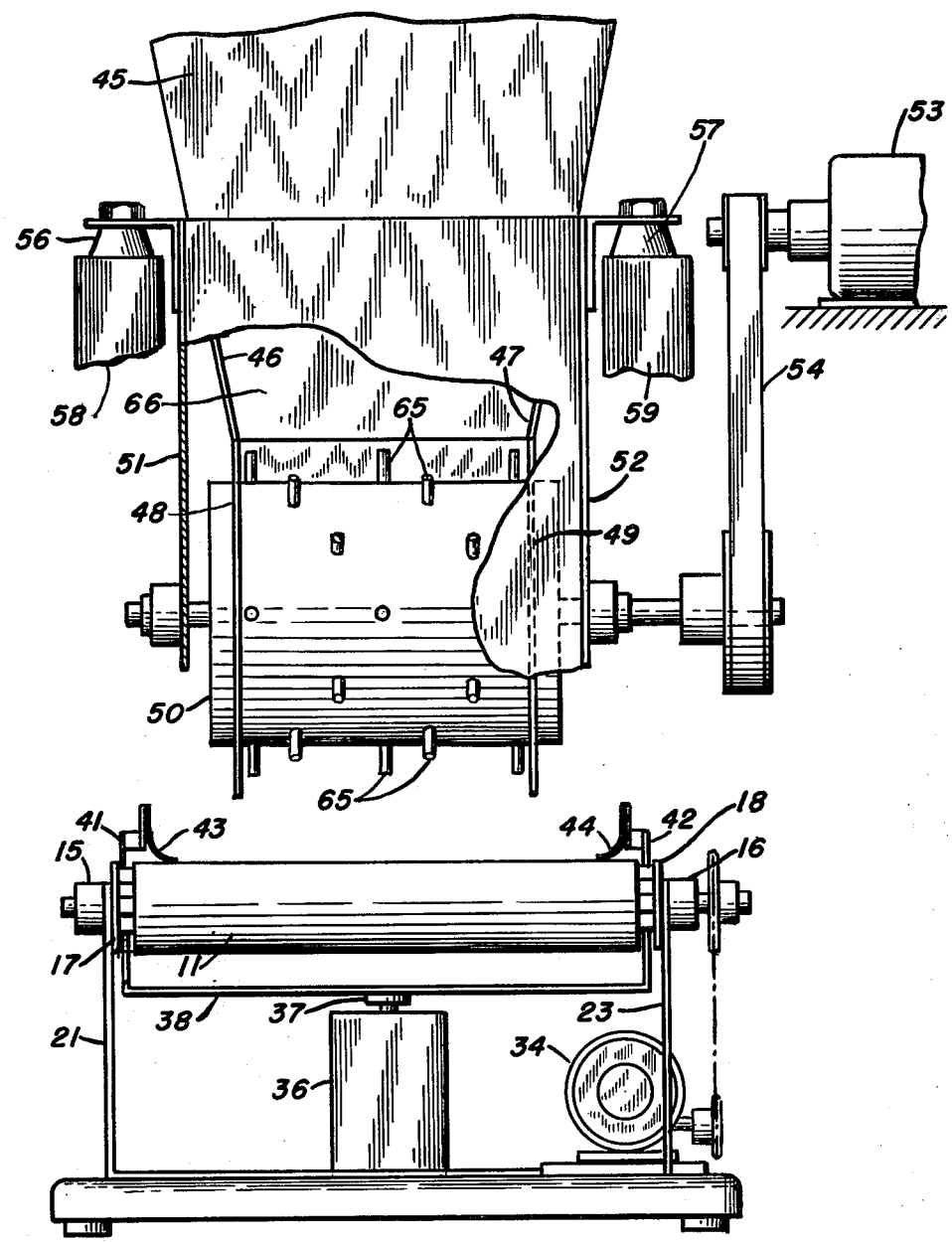
FIG. 2 is a corresponding front elevational view, with a portion of the front wall of the hopper broken away.

Referring to FIGS. 1 and 2, the weigh belt system is mounted on a base plate 10. An endless belt 11, preferably having a teflon-coated outer surface, passes over a pair of rollers 12 and 13, said rollers having rubber-coated surfaces to prevent belt slippage. The roller 12 has a shaft rotatable in aligned bearings 15 and 16 secured to elongated, spaced, frame members 17 and 18, respectively. These frame members are pivotally supported by a pair of leaf springs. Referring to the leaf spring 20 visible in FIG. 1, one end portion of the spring is securely clamped between a pair of flat plates secured to a post 21 which extends upwardly from the base plate 10. The other end portion of the spring is clamped between a pair of flat plates secured to a bracket 22 which is bolted to the frame member 17. The other spring, disposed on the other side of the endless belt, is similarly secured to the frame member 18 and the post 23 which are visible in FIG. 2. The belt passes around an idler roll 24 which is supported by brackets secured to the two frame members. A second pair of elongated frame members 25 and 26 are in axial alignment with the frame members 17 and 18. However, whereas the frame members 17 and 18 are pivotable about an axis formed by the two leaf springs, the frame members 25 and 26 are bolted in fixed positions on post 21 and 27 and similar posts positioned on the other side of the belt. The belt roller 13 has a shaft rotatable in spaced bearings carried by, and adjustable along, the frame members 25 and 26. Referring to the bearing 28 visible in FIG. 1, such bearing is slidably positionable along a slot 29 by means of an adjusting mechanism generally identified by the numeral 30. The upper portion of the belt 11 which extends between the posts 21 and 27 is supported by a flat plate 31, which plate is secured to frame members 25 and 26. The belt roller 13 is driven by a variable speed, d.c. motor 32 having a gear-reduction unit 33. The motor is mounted on the base plate 10 and has a tachometer 34 connected to its drive shaft.

Pivotal displacement of that portion of the weigh belt system which is supported by the two leaf springs is sensed by a load cell 36 having an address button 37 engaged by a strut 38 having offset end portions which are secured to the pivotally-mounted frame members 17 and 18.

A pair of guide rails 41 and 42 are secured to the frame member 17 and 18, respectively, each guide rail having an offset upper portion extending above the upper surface of the endless belt 11. Secured to these guide rails are a pair of skirts 43 and 44, made of a suitable flexible material and being in sliding engagement with the belt surface. Similar guide rails and skirts are secured to the other pair of frame members 25 and 26. It is here pointed out that skirts carried by the frame members 25 and 26 are aligned with those carried by the frame members 17 and 18, thereby to limit the maximum spread of material carried by the belt.

Material is supplied to the dead portion of the belt from a hopper 45, the dead portion of the belt being that portion which is supported by the flat plate 31, as distinguished from the live portion of the belt which extends from the leaf springs to the belt discharge end A. As shown in FIG. 2, the hopper has tappered side walls 46 and 47 terminating in vertical walls 48 and 49, the latter walls being provided with aligned, circular openings through which the drum 50 passes. The drum is carried by a shaft rotatable in bearings secured to the support posts 51 and 52 and the drum is coupled to a variable speed d.c. motor 53 by a belt 54, said motor being mounted on a fixed support. The hopper and the support posts 51 and 52 are supported on vibration isolators 56 and 57 secured to the brackets 58 and 59, respectively, whereby the hopper and drum are vibratable, preferably in a generally horizontal plane, by a conventional electro-mechanical gyrator 60 having eccentric weights secured to its drive shaft. The brackets 58 and 59 have downwardly offset end portions forming legs which support the hopper with its bottom spaced a desired distance above the belt 11. A plurality of radially-extending pins 65 are carried by the drum, which pins preferably are displaced from each other so that a minimum number of the pins come into play at any given time on a line extending longitudinally along the drum surface. Disposed within the hopper is a baffle plate 66 which may be secured to the rear wall of the hopper by a hinge member 67. A suitable adjusting arrangement, generally identified by the numeral 68 may be provided to adjust the spacing between the end of the baffle plate and the drum pins.

When the drum is rotated, material is deposited on that portion of the belt which is supported by the fixed plate 31 and such material is transported by the belt to its discharge end A. The weight of the material on the live portion of the weigh system is sensed by the load cell 36. As will be described, below, signals from the load cell and the tachometer 34 are compared to a reference signal corresponding to a preset material feedrate. A control system continuously monitors the difference between these signals and adjusts the speed of the belt drive motor 32, thereby to maintain the preset material feedrate.

Referring specifically to FIG. 1, it will be noted that in this embodiment of the invention the rear wall 70 of the hopper is flat and inclined toward the vertical plane containing the drum axis, and that the front wall terminates in a lower portion 71 having an arcuate configuration. The reference letter D identifies the rectangular discharge opening presented to the belt, such opening having a width equal to the spacing between the housing walls 70 and 71, and a length equal to the spacing between the housing front wall 48 and rear wall 49, see FIG. 2. When the drum is rotating, the ends of the pins generate circles concentric with the drum axis and spaced a small distance from the edge of the hopper wall 71.

When the apparatus is in operation, the vibrations imparted to the hopper and drum promote the downward flow of material from the hopper to the drum. The drum and pins function as a rotating rake which rakes the fibrous material from the hopper, past the baffle plate and along a first path identified by the arrow $R_1$. When the material deposited onto the belt extends above the discharge opening D, the excess material is returned to the hopper along a second path identified by the arrow $R_2$. The material flow rate along the path $R_1$ is at least equal to the rate at which material is carried away along path $R_3$ by the belt. Also, the flow rate of material along the path $R_2$ is at least equal to the difference between the flow rate along path $R_1$ and the rate along path $R_3$ at which material is carried away by the belt.

The primary purpose of the rotary rake is to maintain a constant level of material on the belt as the material is being transported out of the apparatus. With powdered or granular materials, this could be accomplished by a gate at the discharge end of the feeder. Stringy and fibrous materials cannot be struck off in this way as they would mound up behind the gate and disrupt the otherwise constant material level on the belt. A secondary function of the rotary rake is to provide aggitation in the hopper by the material being returned along the path $R_2$. With stringy or fibrous materials, this results in an undulating action on the material in the hopper from underneath.

Reference now is made to FIGS. 3 and 4. In this embodiment of the invention, the drum 75 extends through aligned openings formed in the front and rear walls of a generally-cylindrical drum housing 76 which is secured to the hopper 77 having inclined side walls and carrying a baffle plate 80. The drum shaft is supported by bearings carried by the brackets 81 and 81' having their upper end portions welded to vertically-disposed front and rear walls of the hopper. A relatively wide slot is formed in the cylindrical wall of the drum housing which slot extends to the housing rear and front walls. This slot constitutes the discharge opening presented to the endless belt 11. The assembly is supported on the vibration isolators 56 and 57 for vibration by the electro-mechanical gyrator 60. For use with some materials, longitudinally-extending skirts 82 and 83 may be secured to the drum housing. However, with most materials the skirt may be omitted, using the natural angle of repose of the material to maintain a constant cross-section of material on the belt. With the skirts omitted, the drum axis may be positioned transversely to the belt as in the FIG. 1 arrangement.

Figure 5:
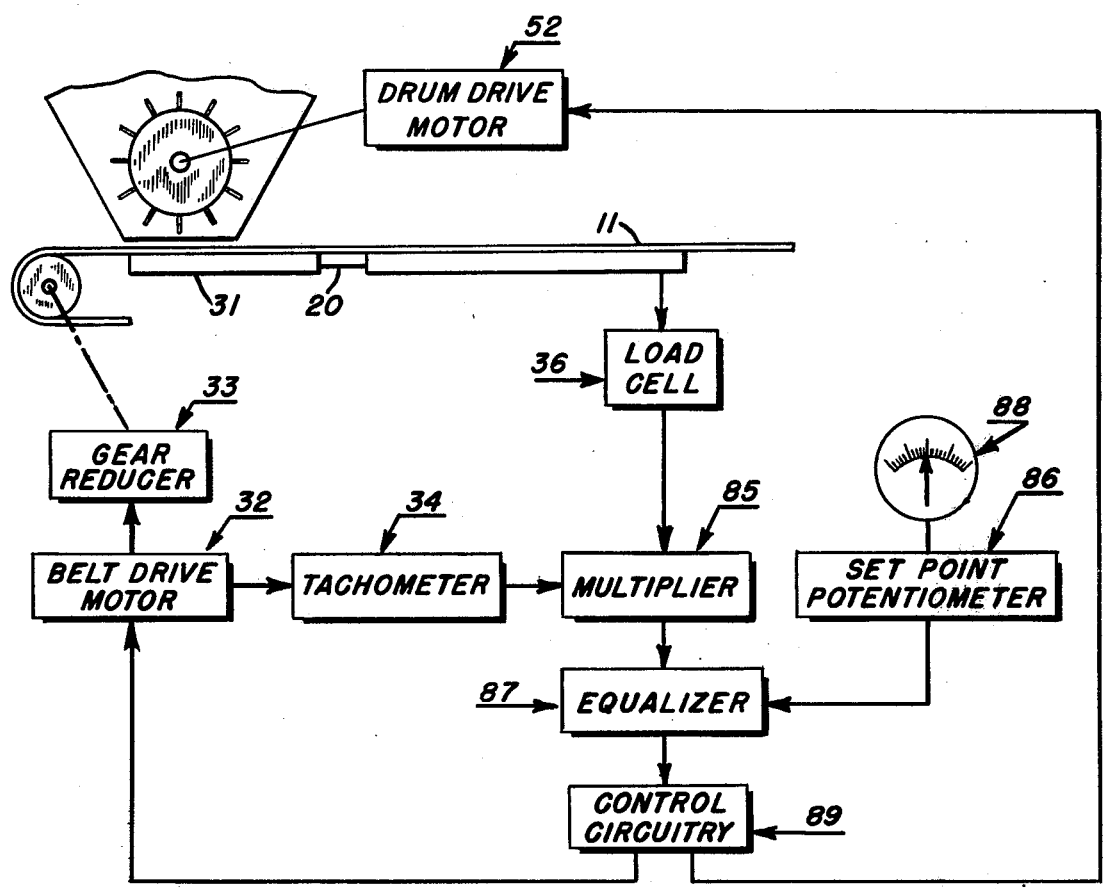
FIG. 5 is a block diagram of the control system.

FIG. 5 is a block diagram of a control system for maintaining a constant, predetermined feedrate of material discharged by the belt. The weight of the material carried on the pivotally-mounted portion of the belt 11 is sensed by the load cell 36 which includes means to tare out the weight of the belt supporting structure. The load cell provides an output voltage proportional only to the material weight. The tachometer 34 produces a voltage proportion to linear velocity of the belt. These voltages are multiplied by a multiplier 85 which produces an output signal which is proportional to the weight of material discharged by the belt per unit time.

A desired material feedrate is established by a manually-adjustable set point potentiometer 86 which applies a constant voltage of predetermined magnitude to an equalizer 87 and to a read-out means 88 providing visual indications in terms of feedrate values. The equalizer senses the command signal from the set point potentiometer and compares it to the signal from the multiplier. The resultant error, or difference signal, is applied to control circuitry 89 controlling the voltage applied to the belt drive motor 32, the magnitude of such voltage depending on the magnitude and sense of the error signal. In the event changes in the linear speed of the belt are not sufficient to provide the preset material feedrate, the control circuitry also changes the speed of the drum driving motor 52. Alternatively, the speed of the motor 52 may be set by manually-adjustable means to provide an excess feedrate of the material deposited on the belt by the drum, as observed visually.

Having now described the invention, what we desire to protect by letters patent is set forth in the following claims:

1. An apparatus for uniform bulk feeding of material onto a conveying belt having a conveying surface positioned beneath the apparatus, said apparatus comprising:
   (a) A container member having substantially enclosed sides and an open top and bottom to facilitate the entrance and egress of material;
   (b) vibrating means for providing a vibratory motion to the container;
   (c) a rotating drum rotatably mounted inside said container to vibrate therewith and having its axis of rotation substantially parallel to the surface of said conveying belt, means for rotating said drum said drum having a multiplicity of projections extending outward form the drum surface thereof for receiving material deposited in said container and onto the upper portion of said drum and displacing said material from said container to said conveying surface, the surface of said drum being predetermined distance from said conveying surface to lay said material into a bed in a predetermined manner on said conveying surface;
   (d) baffle means extending from a first side of the container, toward which the raking of the upper portion of the drum displaces the material; and
   (e) a curved plate affixed to the bottom of a second side of said container member opposite said first side and having an edge positioned between said drum projections and said conveying surface;
   (f) whereby material in the container passes between the baffle means and the rotating drum and thence downwardly between the drum and said first side, whereupon a quantity of the material is directed downwardly through said open bottom onto said conveying surface and excess material is raked by said projections over the lower edge of said curved plate and is carried by the projections back up between the drum and said curved plate into said container, the remainder of said material being removed by said conveying belt.

2. Apparatus as recited in claim 1, wherein said container sides includes spaced vertical walls having aligned circular openings, wherein end portions of the drum extend through such openings, and wherein the ends of said pins generate circles concentric with the drum axis and proximate to said container bottom.

3. Apparatus as recited in claim 1, wherein said baffle means includes an inclined baffle plate positioned to direct the flow of material to a predetermined area of the drum, said baffle plate extending longitudinally of the drum and having an end spaced from the said pins.

4. Apparatus as recited in claim 1, wherein the container is supported on vibration isolators.

5. An apparatus for uniform bulk feeding of tobacco material as a layer to processing stages in a treatment operation comprising:
   (a) a container member having substantially enclosed sides and an open top and bottom to facilitate the entrance and egress of tobacco material;
   (b) vibrating means for providing a vibratory motion to the container;
   (c) a conveying belt having a conveying surface positioned beneath the container for receiving tobacco material and removing said tobacco material from beneath the container;
   (d) a rotating drum rotatably mounted inside said container and having its axis of rotation substantially parallel to the surface of said conveying belt means for rotating said drum said drum having a multiplicity of projections extending outward from the drum surface thereof for receiving material deposited in said container and onto the upper portion of said drum and displacing said material from said container to said conveying surface, the surface of said drum being a predetermined distance from said conveying surface to lay said tobacco into a bed in a predetermined manner on said conveying surface;
   (e) a baffle plate secured to a first side of the container, toward which the raking of the upper portion of the drum displaces the material, said plate extending toward the drum and inclined downwardly with respect to the horizontal, and terminating in spaced relation from the projections on said drum, wherein the gap between said baffle plate and the projections on the drum permits a metering of material to said conveying surface; and
   (f) a curved plate affixed to the bottom of a second side of said container member opposite said first side upon which said baffle plate is secured and having an edge positioned between said drum projections and said conveying surface;
   (g) whereby tobacco material in the container passes between the baffle plate and the rotating drum and thence downwardly between the drum and said first side, whereupon a quantity of the material is directed downwardly through said open bottom onto said conveying surface and excess material is raked by said projections over the lower edge of said curved plate and is carried by the projections back up between the drum and said curved plate into said container, the remainder of said material being removed by said conveying belt.

6. Apparatus as recited in claim 5, wherein the conveying belt is mounted for pivotal displacement about a horizontal axis, a variable speed motor mechanically coupled to said belt and means for controlling the speed of said variable speed motor in correspondence with pivotal displacement of said belt.

7. Apparatus as recited in claim 5, including a fixed plate supporting the upper portion of the conveying belt in the region of said container bottom, means mounting the belt for pivotal displacement about a horizontal axis spaced from said discharge opening, a variable speed motor mechanically coupled to said belt and means for controlling the speed of said variable speed motor in correspondence with pivotal displacement of said belt.

8. Apparatus as recited in claim 1, wherein the said means for rotating the drum is a variable speed motor mounted on a fixed support and mechanically-coupled to said drum.

9. An apparatus for the bulk feeding of a uniform bed of material comprising:
 (a) a container member having openings to facilitate the entrance and egress of the material;
 (b) vibration means operatively mounted in cooperative relation to said container for vibrating the material within said container;
 (c) conveying means defining a conveying surface positioned beneath the egress opening of said container for receiving material therefrom, said surface being movable in a predetermined direction and at a predetermined speed;
 (d) means operatively mounted in said container for positively displacing the material from said container and distributing a predetermined amount of material to said conveying means and laying said material to form a bed thereon of a predetermined depth, said displacing and laying means comprising a drum rotatably mounted in said container for rotation about an axis, said axis being transverse to the direction of movement of said conveying surface, said drum having a plurality of pins adjacent said container member and mounted on and extending outwardly from the surface of said drum container member and means for rotatably driving said drum, the surface of said drum being spaced from said conveying surface a prredetermined distance to lay said material on said conveying means to a bed of a predetermined depth; and
 (e) plate means on the container mounted in cooperative relation to said convening means and said drum, said plate means defining an edge extending across said conveying surface for engaging said bed at a predetermined spacing above said conveying surface to separate the upper portion of the bed of material and, in cooperation with said drum, rrecirculate said removed portion back into the container.

10. The apparatus of claim 9 including a load sensing means for sensing variations in linear weight of material on said conveying means as the material is removed from beneath the container.

11. The apparatus of claim 10 wherein said load sensing means produces a signal in proportion to variation in linear weight and means are provided for connecting said load sensing means to the drum drive means for causing the linear speed of said rotary drum to vary.

12. The apparatus of claim 9 wherein means are provided for controlling the linear speed of said rotary drum relative to the speed of said conveying means.

13. The apparatus of claim 9 wherein said displacing and laying means further comprises a plate secured to the side of said container toward which the rotary drum rotates when displacing the material supplied at the top of the drum, positioned adjacent the upper portion of said rotary drum, and extends downwardly and outwardly with respect to a vertical plane, the lower edge of said plate being in spaced relation from the ends of said pins as they rotate past said edge to permit a predetermined amount of material to be displaced from the container.

14. The apparatus of claim 9 wherein said drum is cylindrical having a circular cross section and wherein said plate means is defined by a plate member located adjacent the lower portion of said rotary drum and has an arcuate shape paralleling the cylindrical surface of the rotary drum.

15. The apparatus of claim 9 including means to rotate said drum in the same direction as the direction of movement of said conveying means.

16. A process for the uniform bulk feeding of fibrous materials comprising the steps of
 (a) moving a mass of material into a container;
 (b) vibrating the mass of the material in said container;
 (c) displacing a predetermined amount of the material from said container onto and across a moving belt by rotating a drum, having an axis transverse to the direction of movement of the belt and projections thereon, through the vibrated mass of material to positively displace material from said mass, metering said displaced material by blocking the movement of some of displaced material and further rotating said drum to positively displace the metered material to said moving belt;
 (d) further rotating said drum so that said drum lays the material onto said belt and into a bed on the belt;
 (e) removing the upper layer of the bed by raking the upper layer with the projections on the rotating drum over a curved bottom plate on the container to displace said layer and recirculating said layer back into the container to provide a bed of uniform depth on the conveyor.

17. The process of claim 16 comprising the further steps of sensing the linear weight of the material on said belt and varying the speed of the rotating drum when changes in said linear weight are sensed.

18. The process of claim 16 comprising the further steps of varying the speed of the rotating drum in response to variations in the speed of the moving belt so as to provide a substantial constant density per unit length of the bed of material.

19. The process of claim 16 wherein the step of rotating said drum includes the further limitation of rotating said drum in the same direction as the direction of movement of the belt.

20. The process of claim 16 wherein the step of rotating said drum includes the further limitation of rotating the periphery of said drum at a linear speed greater than the speed of the conveyor belt.

21. An apparatus for uniform bulk feeding of tobacco material as a layer to processing stages in a treatment operation comprising
 (a) a container member having substantially enclosed sides and an open top and bottom to facilitate the entrance and egress of tobacco material;
 (b) vibrating means for providing a vibratory motion of the container;
 (c) a conveying belt having a conveying surface positioned beneath the container for receiving tobacco material and removing said tobacco material from beneath the container;
 (d) a rotating drum rotatably mounted inside said container and having its axis of rotation substantially parallel to the surface of said conveying belt and substantially transversely aligned with respect to the longitudinal axis of the belt, means for rotating said drum said drum having a multiplicity of projections extending outward from the surface thereof for receiving material deposited in said container and onto the upper portion of said drum and displacing said material from said container to said conveying surface, the surface of said drum being a predetermined distance from said conveying surface to lay said tobacco into a bed in a predetermined manner and said conveying surface;

(e) a baffle plate secured to the side of the container, toward which the raking of the upper portion of the drum displaces the material, said plate extending toward the drum and inclined downwardly with respect to the horizontal, and terminating in spaced relation from the projections on said drum, wherein the gap between said baffle plate and the projections on the drum permits a metering of material to said conveying surface; and a plate member adjacent said container member and mounted in cooperative relation to said container member and having an edge so positioned between said drum projections and said conveying surface that it removes the upper layer of said bed of material on the conveying surface from the remainder of the bed as the conveying surface and drum projections move the material into said edge, said projections raking said upper layer back into the container.

22. The apparatus of claim 21 wherein the projections are pins, and said pins are arranged in a plurality of rows positioned helically about the drum.

23. Apparatus for feeding a bed of fibrous material comprising:
   (a) a movable belt having a certain direction of horizontal travel;
   (b) a hopper above the belt including vertical side walls spaced to each side of the center of the belt, a steeply inclined flat rear wall, and a curved front wall forward of the rear wall in relation to the direction of belt travel, said front and rear walls having lower edges transverse to the direction of belt travel and said side walls having lower edges parallel to the direction of belt travel, said edges together defining a horizontal discharge opening spaced immediately above the belt;
   (c) a rotatable drum mounted within said hopper about a horizontal axis transverse to the direction of belt travel and above the lower edge of the curved front wall of the hopper;
   (d) an inclined baffle plate in said hopper above said drum and having a lower edge parallel to the drum axis;
   (e) a plurality of pins extending radially from the drum and having ends which upon rotation of the drum in a certain direction pass in proximity to the lower edge of the baffle plate and then the rear and front walls of the hopper in that order;
   (f) means for vibrating said drum and hopper;
   (g) means for moving said belt in said certain direction of travel; and
   (h) means for rotating said drum in said certain direction;
   (i) whereby fibrous material in the hopper passes between the baffle plate and the rotating drum and thence downwardly between the drum and the hopper rear wall, whereupon a quantity of the material is directed downwardly through said discharge opening onto the belt and excess material is raked by the pins over the lower edge of the curved front wall of the hopper and is carried by the pins back up between the drum and said curved front wall into the hopper, the remainder of said material being carried forward on said belt in a bed having a depth determined by the height of the lower edge of said curved front wall above said belt.

24. A process for the uniform bulk feeding of fibrous materials comprising the steps of
   (a) moving a mass of material into a container;
   (b) vibrating the mass of the material in said container;
   (c) displacing a predetermined amount of the material from said container onto and across a moving belt by rotating a drum having projections thereon, through the vibrated mass of material to positively displace material from said mass, metering said displaced material by blocking the movement of some of displaced material and further rotating said drum to positively displace the metered material to said moving belt;
   (d) further rotating said drum so that said drum lays the material onto said belt and into a bed on the belt;
   (e) removing the upper layer of the bed by raking the upper layer with the projections on the rotating drum over a curved bottom plate on the container to displace said layer and recirculating said layer back into the container to provide a bed of uniform depth on the conveyor.

* * * * *